(12) United States Patent
Tagansky (10) Patent No.: US 8,033,752 B2
(45) Date of Patent: Oct. 11, 2011

(54) SYSTEM FOR GENERATING ENERGY FROM SEA WAVES

(76) Inventor: Elazar Tagansky, Rosh Haayin (IL)

( * ) Notice: Subject to any disclaimer, the term of this patent is extended or adjusted under 35 U.S.C. 154(b) by 0 days.

(21) Appl. No.: 12/518,885

(22) PCT Filed: Dec. 13, 2007

(86) PCT No.: PCT/IL2007/001543
§ 371 (c)(1),
(2), (4) Date: Jun. 12, 2009

(87) PCT Pub. No.: WO2008/072241
PCT Pub. Date: Jun. 19, 2008

(65) Prior Publication Data
US 2010/0034589 A1    Feb. 11, 2010

(30) Foreign Application Priority Data
Dec. 14, 2006    (IL) .......................... 180052

(51) Int. Cl.
E02B 9/08 (2006.01)
(52) U.S. Cl. .......................... 405/77; 405/76
(58) Field of Classification Search .......... 405/75, 405/76, 77
See application file for complete search history.

(56) References Cited

U.S. PATENT DOCUMENTS

| | | | |
|---|---|---|---|
| 845,214 A * | 2/1907 | Bazin | 405/77 |
| 969,967 A * | 9/1910 | MacDonald | 405/77 |
| 1,055,033 A * | 3/1913 | Hale | 405/77 |
| 1,507,461 A | 9/1924 | Chase | |
| 1,922,055 A * | 8/1933 | Marx | 405/77 |
| 2,441,759 A * | 5/1948 | Gay | 405/77 |
| 3,983,404 A | 9/1976 | Sherrard | |
| 4,040,257 A | 8/1977 | Andrews | |
| 4,263,516 A | 4/1981 | Papadakis | |
| 4,286,347 A | 9/1981 | Modisette | |
| 4,332,506 A | 6/1982 | Andrews | |
| 5,443,361 A | 8/1995 | Skaarup | |
| 6,716,107 B2 | 4/2004 | Lochtefeld | |
| 2005/0226687 A1 | 10/2005 | Black | |

FOREIGN PATENT DOCUMENTS

| | | |
|---|---|---|
| GB | 2314124 | 12/1997 |
| JP | 2001172950 | 6/2001 |
| WO | WO2006037983 | 4/2006 |

OTHER PUBLICATIONS

Israel Office Action for Israel Application 180052 (priority document of the present application) mailed on Oct. 29, 2009 in Hebrew.

(Continued)

*Primary Examiner* — Frederick L Lagman (57) ABSTRACT

A system for generating energy from sea or ocean waves flowing toward a shore, comprises a channel or a container and a slanting structure constructed above the surface of the sea. The slanting structure is located in the way of waves toward the channel or container so the waves are lifted along the slanting structure wherein the wave energy is transformed into a generally homogenous flow. The water flow enters the channel or container to fill it to a level higher than sea level. Preferably, the slanting structure is placed in a location where the horizontal distance between adjacent waves is twice the depth (vertical distance) between the adjacent waves.

18 Claims, 6 Drawing Sheets

OTHER PUBLICATIONS

English Translation of Israel Office Action for Israel Application 180052 (priority document of the present application) mailed on Oct. 29, 2009.

Applicant Response to Israel Office Action for Israel Application 180052 (priority document of the present application) mailed on Oct. 29, 2009 (response is dated Apr. 19, 2010).

Israel Office Action for Israel Application 180052 (priority document of the present application) mailed on Jul. 27, 2010 in Hebrew.

English Translation of Israel Office Action for Israel Application 180052 (priority document of the present application) mailed on Jul. 27, 2010.

* cited by examiner

SYSTEM FOR GENERATING ENERGY FROM SEA WAVES

CROSS-REFERENCE TO RELATED APPLICATIONS

This patent application is a National Stage application filed under 35 U.S.C. §371 of PCT/IL2007/001543 filed on Dec. 13, 2007, which claims priority to Israel Patent Application No. 180052 filed on Dec. 14, 2006 and amended on Oct. 28, 2007, which are both hereby incorporated in their entirety by reference.

FIELD OF THE INVENTION

The invention relates to a system for generating energy from sea or ocean waves flowing toward a shore.

BACKGROUND OF THE INVENTION

The present application claims priority from the patent application filed in Israel by the present applicant, application No. 180052 filed on 14 Dec. 2006, and additions to the above application filed on 28 Oct. 2007.

The present invention relates to a system, whereby sea waves are captured and transformed into a current flowing in a channel constructed above the surface of the sea, generating energy by a continuous and homogenous flow of water on its way back to the sea.

The creation of energy from sea waves has been known in the past. Up to the present, the creation of energy from the sea or ocean waves has been based on the exploitation of these waves in their direct natural form, according to a wide variety of methods. However, these methods were characterized by a fundamental disadvantage: Lack of homogenous continuity between one wave and the next, thus considerably complicating the process of energy production.

SUMMARY OF THE INVENTION

According to the present invention, a new system is used for capturing and channeling of sea waves.

According to the present invention, whereby the captured waves create and build a watercourse above the surface of the sea, exploitation of the flow from the artificial watercourse back to the sea makes the energy production more simple and according to the state of the art.

According to the existing theory, when one half of the length of a wave hits the shore ground, the shape of the wave gradually changes from round to elliptic while advancing in the direction of the shore, until it turns into a horizontal flow and finally breaks on reaching the shore.

In the present invention, the development process of the wave is shortened considerably and almost suddenly by a slanting structure, which captures the wave (preferably at the point at which the wave meets the ground, the sea floor).

The slanting structure—meaning slanting up toward the shore, slanting in a vertical plane. The structure may be partially in the water and partially above the surface of the water.

Thereby, the full impact of the wave is obtained all at once. By means of the slanting structure, the waves are elevated higher than in their natural course.

This elevation is utilized for filing a channel or water container placed off-shore above the surface of the sea. In another embodiment, the container is partially lifted above the surface of the sea, and may be located in the sea itself, close to shore.

Using the present invention, it is possible to raise the water flowing inside the channel to a level higher than that reached by the waves in the respective area. The channel has one or more openings to allow the water to flow back to the sea. The water flowing back to the sea in a continuous current exerts pressure on a water wheel or a turbine or any other technical means which utilizes pressure to generate energy.

Thus, kinetic energy in the waves is transformed into potential energy of water in an elevated channel or container or reservoir.

In other embodiments, the system may use various means for converting water flow energy into mechanical rotary movement energy.

The present relates to a device, whereby sea waves are captured and transformed into a current flowing in a channel constructed above the surface of the sea, generating energy by a continuous and homogeneous flow of water on its way back into the sea.

Thus the system will generate energy from sea or ocean waves flowing toward a shore.

In a preferred embodiment, the new system comprises a channel or a container and a slanting structure (slanting in a vertical plane) constructed partially above the surface of the sea. The slanting structure is located in the way of waves toward the channel or container so the waves are lifted along the slanting structure wherein the wave energy is transformed into a generally homogenous flow, and wherein the water flow enters the channel or container to fill it to a level higher than sea level.

Further objects, advantages and other features of the present invention will become obvious to those skilled in the art upon reading the disclosure set forth hereinafter.

DETAILED DESCRIPTION OF THE PREFERRED EMBODIMENTS

A preferred embodiment of the present invention will now be described by way of example and with reference to the accompanying drawings.

Referring to FIGS. 1, 2, and 3A and 3B, a wave 1 coming from the sea 2 in the direction of the shore 3 in its theoretically round shape and in its major part below sea level 4, hits a slanting structure 5 (slanting in a vertical plane) creating an almost ideal breakwater for capturing the water coming in the wave 1.

In a preferred embodiment, the slanting structure 5 is located in the depth of the sea, approximately at a point where the wave 1 meets the shore 6 in its natural course, which is at the bottom of the sea 2 flowing in the direction of the shore 3.

Wave 1, upon encountering the almost ideal slanting structure 5, turns, on contact with the structure 5, from a round shape (an about circular flow of water in a vertical plane) into a generally elliptical shape (an about elliptical flow of water in a vertical plane), as the wave continues to move upward along the slanting structure 5, thus turning into a straight linear flow 8 running along the slanting structure 5 in the direction of the slanting structure top 9 and flows in a gush 10 into a channel 11.

The upward flow of the water in the wave 1, which flows in a straight flow 8 in the direction of the slanting structure top 9, slows down in speed and consequently, it may be possible that only part of the quantity of water coming in the wave 1 will reach the top 9 of the slanting structure and gush into the channel 11.

The channel 11 is located, on purpose, in the direction of the wave 1 toward the shore 3, so that the wave 1 coming from the direction of the sea 2, gradually enters the channel 11 from one side 12 and flows to the other side 13, while at about the same time a new wave will impinge upon side 12, etc. Thus channel 11 is filled incessantly, causing the water level 14 in the channel 11 to maintain an about constant height.

Some changes in the height may occur due to the waves, but it is significantly reduced relative to the level changes in the sea itself.

The flow of water 15 in the channel 11 underneath the slanted breakwater 16 allows the water to pass only in the bottom part 17 of the channel 11 on its way back to the sea 2, through means for converting the water flow into another form of usable energy, for example rotary mechanical motion. For example, means for converting the water flow may comprise a water wheel 18 equipped with blades, which is rotated by the flow of water 19 exiting the channel 11, thus creating a rotary movement 20, by which energy can be generated, for example using an electrical generator. The conversion means may utilize a turbine or other means as known in the art.

In a preferred embodiment, at the point of exit of the flow of water 19, there is a breakwater 21 which prevents the waves from interfering with the flow of water 19 back into the sea.

Preferably, the system is built of stainless steel plate or plates and rests on stainless steel pipes 22, which, in part, may penetrate the sea bottom 6 at a desired point. Alternatively, the structure is of any other form of construction, or as known in the art.

Figure 1:
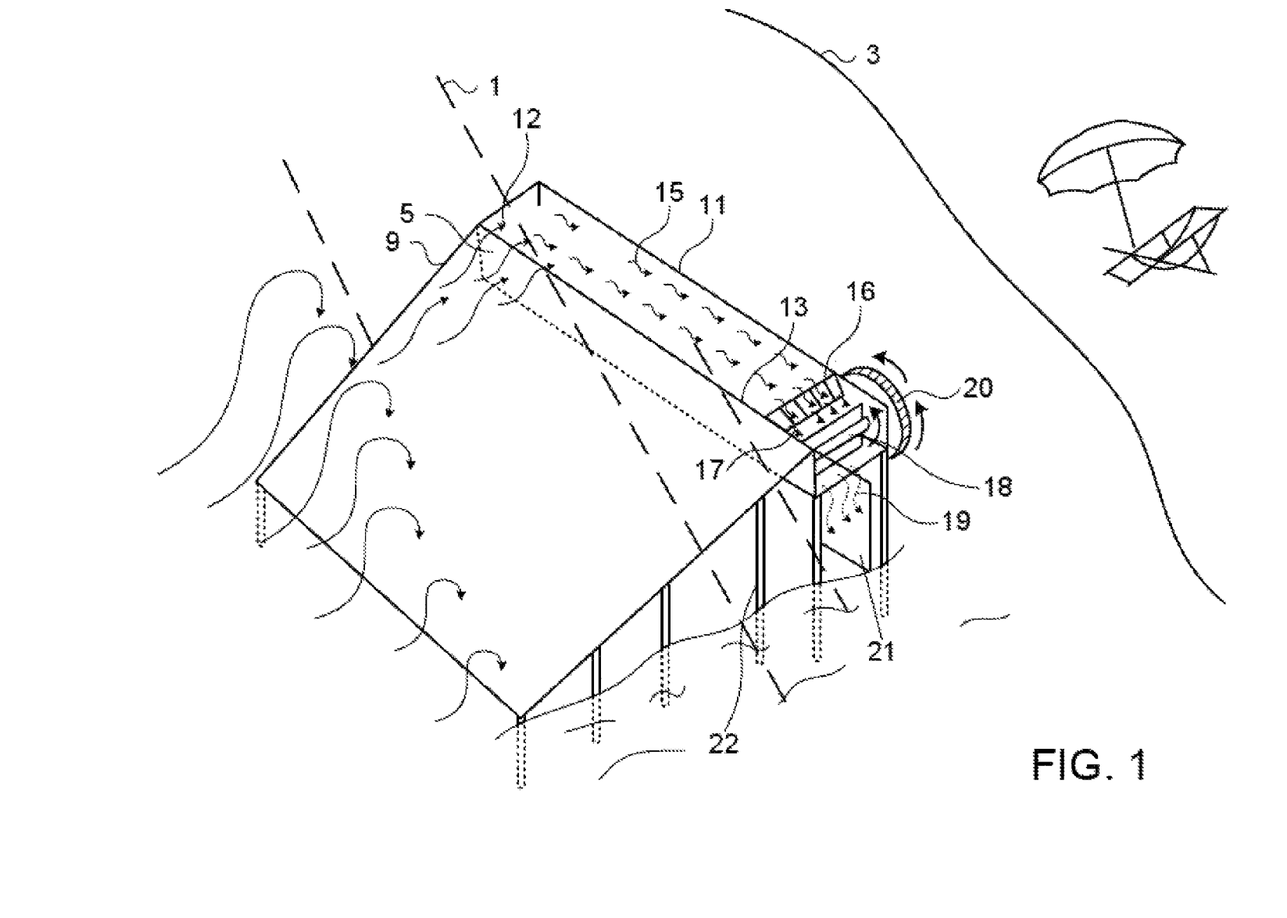
FIG. 1 illustrates an isometric view of the system
FIG. 2 details a side view of the system
FIGS. 3A and 3B detail another side view of the system
FIG. 4 details a top view of the system, detailing the structure slanting in a horizontal plane
FIG. 5 details the container side wall with unidirectional windows.
Figure 2:
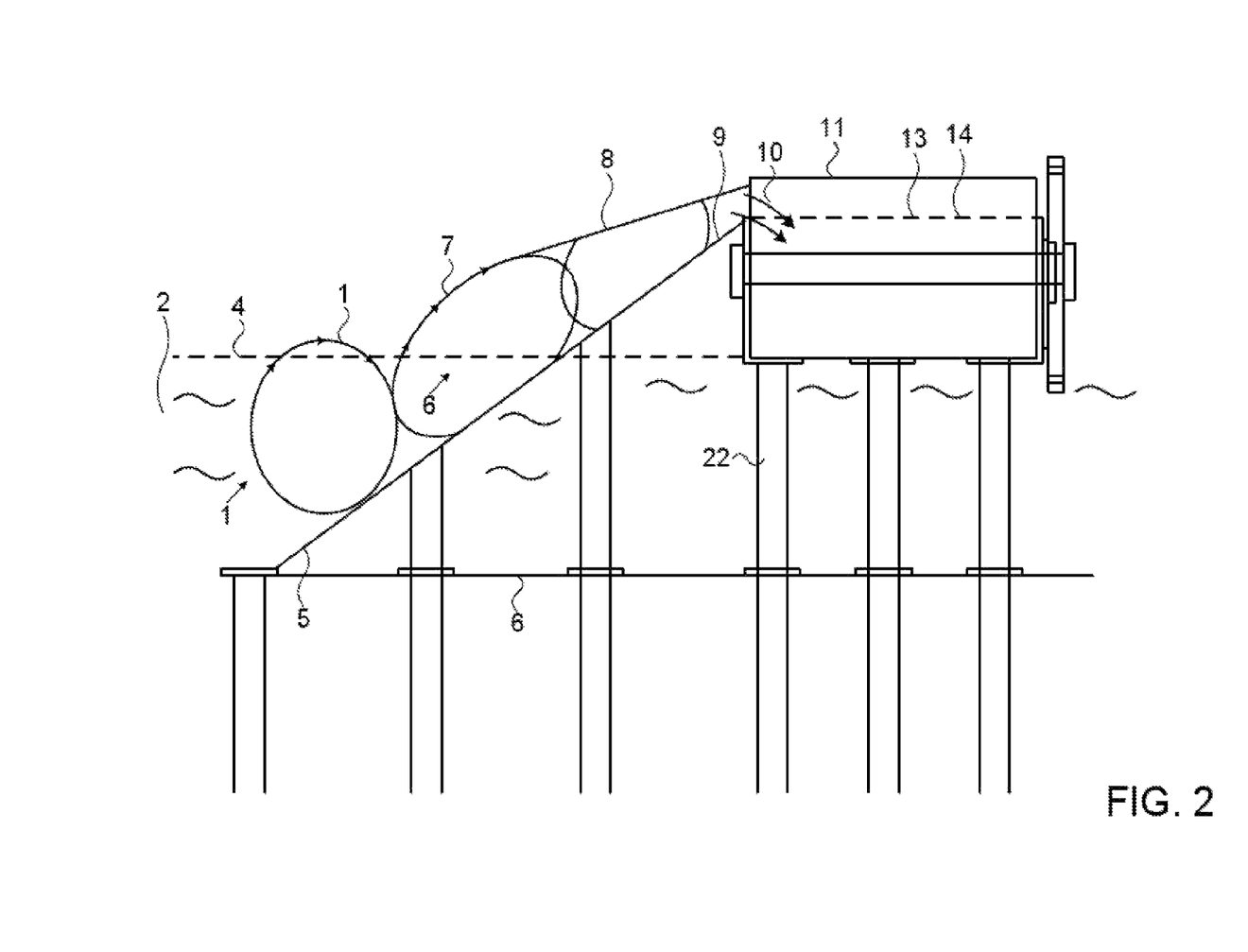
Figure 3A:
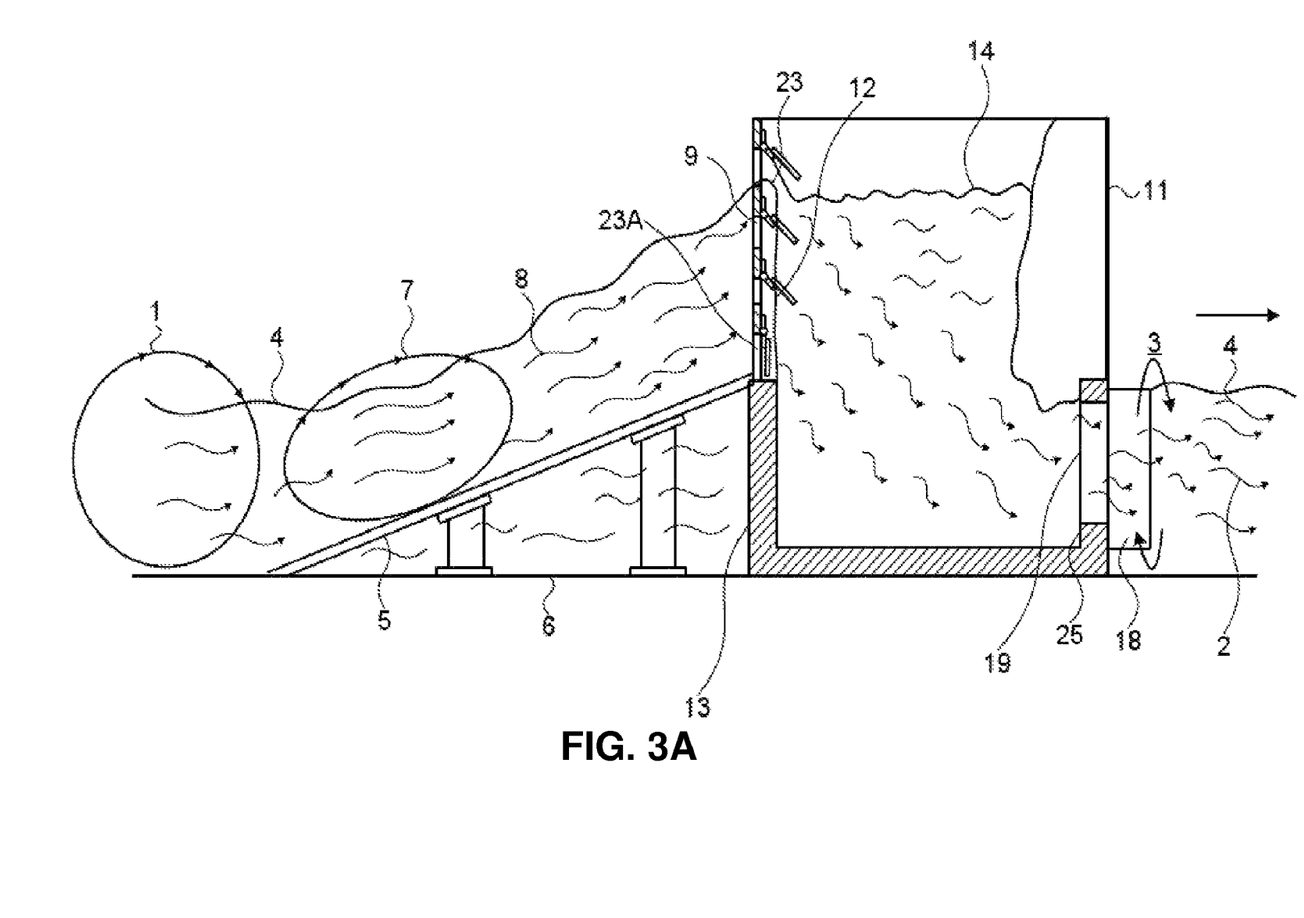
Figure 3B:
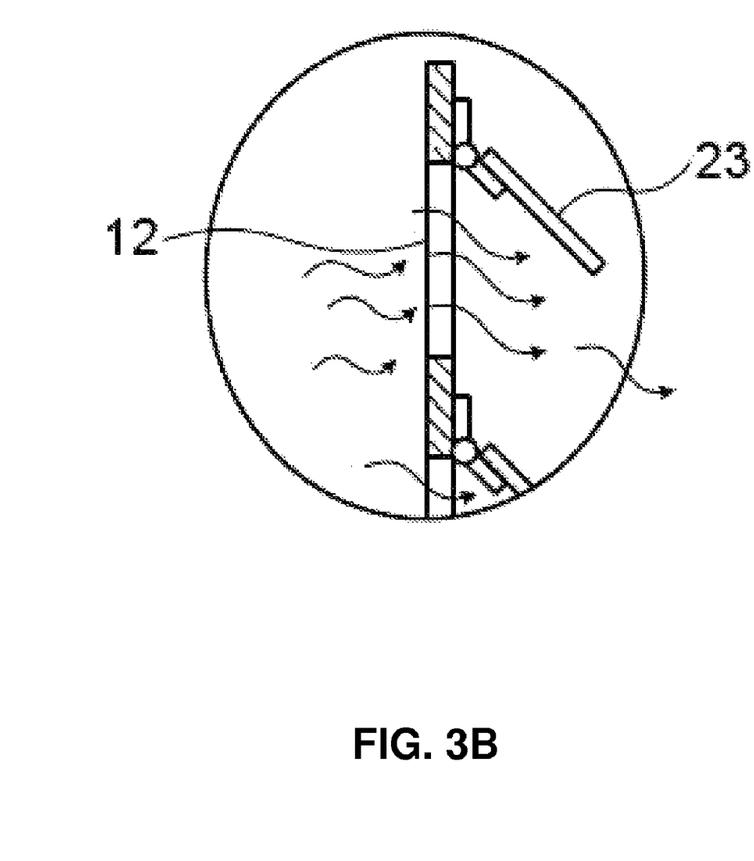
Figure 4:
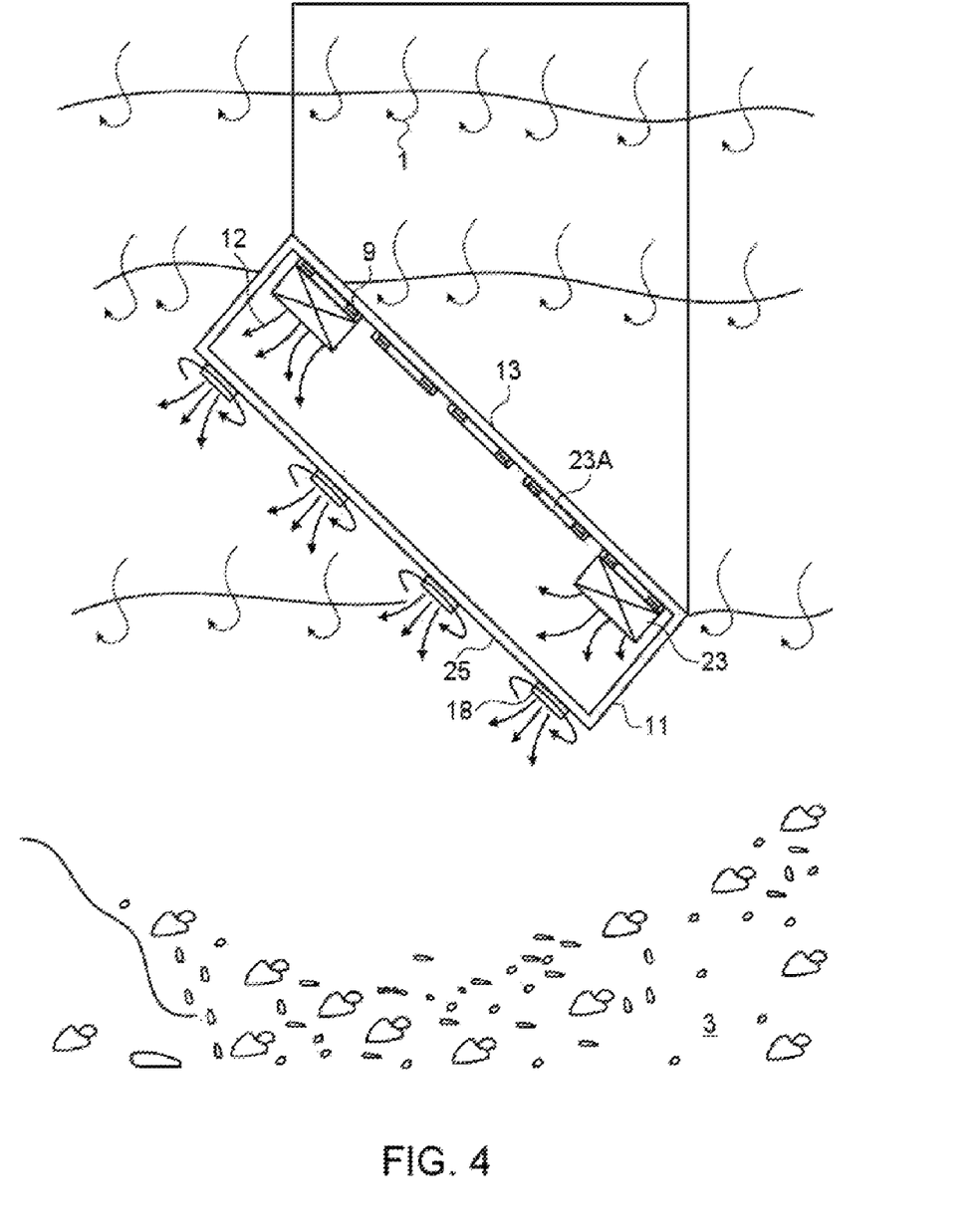

FIG. 4 details a top view of the system, detailing the structure 13 slanting in a horizontal plane, with respect to the front of the waves 1 impinging upon the system.

A wave 1, with a kinetic energy, flows from the sea 2 towards the shore 3 in its theoretically round shape, and reaches the slanting structure 5 placed in the depth of the sea, approximately in the spot where the wave 1 naturally touches the sea bottom 6.

As the wave 1 reaches the almost ideal slanting structure 5 in order to reach the container 11, with its full kinetic energy before wearing and losing energy on the sea bottom 6 as it flows toward the shore 2, the new system creates an artificial powerful breakwater that lifts the wave 1 up the slanting structure 5 and turns its shape to a generally elliptical form 7, and as the wave 1 climbs up the slanting structure 5 it turns into a homogenous flow 8.

The homogenous flow 8 reaches the container side wall 13 which includes unidirectional windows (or valves) 23 that are opened sideways by the water flow, and allow the water flow 12 into the container 11. The water level 14 inside the container 11 raises and pushes and closes 13A, the rotary snails 23, thus preventing the water from exiting the container back to the sea, as detailed in FIGS. 3 and 4.

The flow of water by which the waves enter into the container is unavoidable since the container side wall's direction is angled to the water flow, as described in FIG. 4.

When the wave's course on the slanting structure 5 and through the unidirectional windows, which open and close alternatively, ends, a new wave flows and goes through the same course, etc.

Figure 5:
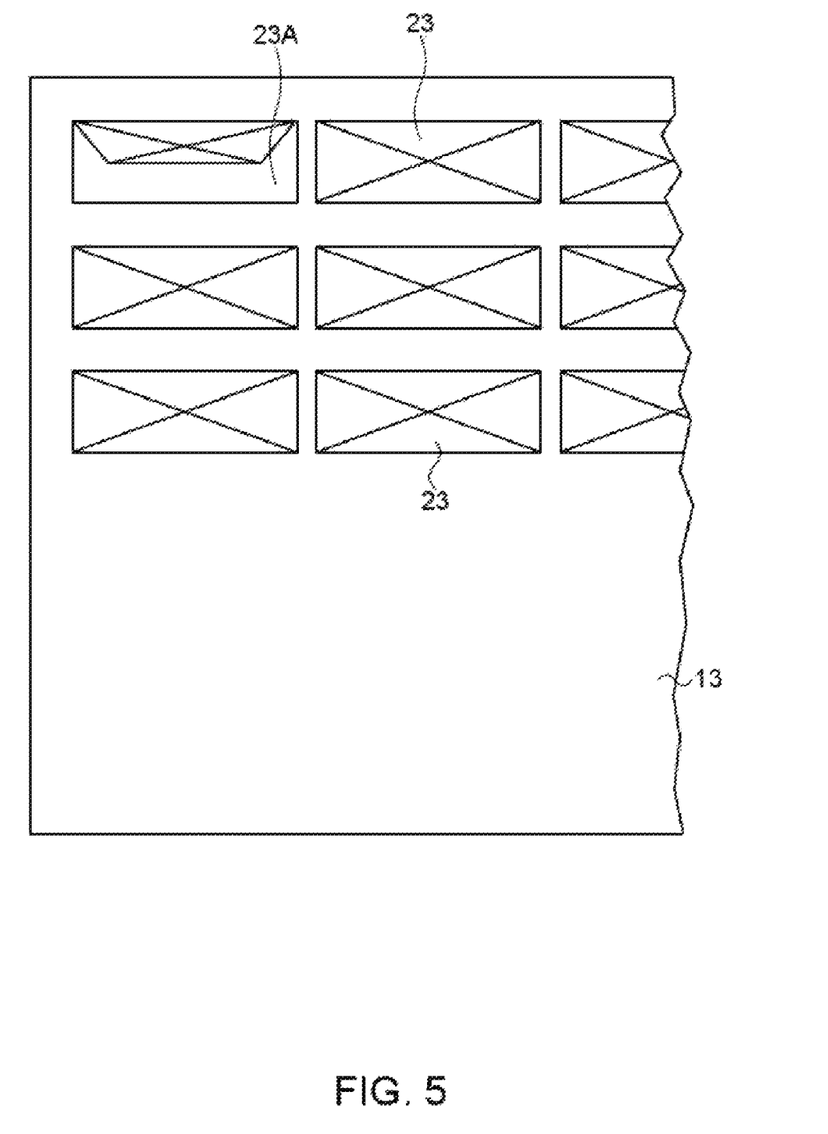

FIG. 5 details the container side wall with unidirectional windows 23, 23A as an example.

The other container side wall 25 includes turbines 18. Through these turbines 18, the water 19 flows back to the sea 2 (in accordance to the law of connected vessels).

The difference between the water level inside the container and the sea level is the potential energy which creates the flow of water through the turbine (kinetic energy), which rotates the turbine to generate rotational mechanical energy.

Another Embodiment of the Invention

In a second embodiment of a system or method, the container side walls and bottom are placed on the sea ground, and are sealed on the sides and bottom to the extent of forming a bath form.

The water entry from the sea or ocean and the water level rising in the container is carried out through unidirectional windows installed in the container side wall, which open and close alternately, so as to allow water in while preventing water out of the container.

Water may exit back the sea or ocean through turbines, which are installed in the container's other side wall. The difference between the water level inside the container and the sea level will cause the water to flow through the turbines (in accordance to the law of connected vessels), thereby converting the water flow into rotary energy.

In the system for generating energy, the slanting structure is placed in a location where the horizontal distance between adjacent waves is twice the depth (vertical distance) between the adjacent waves.

The slanting structure may form an artificial breakwater.

The channel or container is placed at a slant angle in a horizontal plane with respect to the wavefront of waves advancing toward the shore.

The channel or container may be more than about 50 meter long.

In another embodiment, the length of channel or container is between about 15 meter and several kilometers.

Preferably, the container is placed on the bottom of the sea, and wherein the container comprises side walls and a bottom which are sealed together to prevent water flow therethrough.

Preferably, the system for generating energy is so devised, as to allow the water to enter the channel or container through unidirectional windows or shutters, which allow water to flow in but prevent them from flowing back out.

The system for generating energy may further include an opening for water flowing out the device, wherein the opening is in on the side of the channel or container which is opposite to that where water enters the system.

The system for generating energy may further include turbine means located at the opening for water flowing out the device, for converting energy of water flowing out into mechanical energy.

Preferably, the channel or container and the slanting structure are made of non rusting and sea resistant materials.

It will be recognized that the foregoing is but one example of an apparatus and method within the scope of the present invention and that various modifications will occur to persons skilled in the art upon reading the present disclosure together with the drawings. Other embodiments of the invention may be implemented, without departing from the spirit and scope of the present invention.

What is claimed is:

1. A system for harvesting energy of sea or ocean waves flowing towards a shore, the system comprising:
   a) a channel including a side wall that includes a plurality of unidirectional windows or shutters, each unidirectional window or shutter being deployed at a different elevation above a surface of the sea or ocean, the windows or shutters being configured to allow wave water to flow into the channel from the sea or ocean while preventing water in the channel from flowing back into the sea or ocean via the unidirectional windows or shutters; and
   b) a slanting structure deployed in the way of waves moving towards the channel so that waves are lifted along the slanting structure into the channel via the windows, the channel and the slanting structure being configured so that wave water incessantly enters into the channel via the windows or shutters to create an artificial river whose surface height remains both substantially constant and above the sea or ocean surface; and
   c) a turbine means or a turbine or a water wheel configured to harvest kinetic energy of a horizontal current of the artificial river.

2. The system of claim 1 wherein the channel includes side walls that are partially located above the sea or ocean surface and partially located below the sea or ocean surface.

3. The system of claim 1 wherein the channel is oriented non-perpendicularly relative to the shore.

4. The system of claim 1 wherein the channel includes one or more openings via which water of the artificial river exits the channel back into the sea, the system further comprising:
   d) an interference-preventing breakwater which prevents sea waves from interfering with a flow of water exiting the channel via one or more of the openings.

5. The system of claim 4 wherein the turbine means or turbine or water wheel is located at one of the openings.

6. The system of claim 4 wherein the interference-preventing breakwater is oriented along a direction of the channel and configured to protrude beyond the slanting structure.

7. The system of claim 1 wherein a bottom of the channel is elevated above the sea bed.

8. The system of claim 1 wherein a bottom of the channel is located on the sea bed.

9. The system of claim 1 wherein a flow of the artificial river is a continuous.

10. The system of claim 1 wherein a flow of the artificial river is a generally homogeneous flow.

11. The system for generating energy according to claim 1, wherein the slanting structure forms an artificial breakwater.

12. The system for generating energy according to claim 1, wherein the channel or container is placed at a slant angle in a horizontal plane with respect to the wavefront of waves advancing toward the shore.

13. The system for generating energy according to claim 1, wherein the channel or container is more than about 50 meter long.

14. The system for generating energy according to claim 1, wherein the length of channel or container is between about 15 meter and several kilometers.

15. A method of harvesting energy of sea or ocean waves comprising:
   a) incessantly receiving wave water into a channel via a plurality of unidirectional windows or shutters deployed at different heights above a surface of the sea or ocean so that:
      i) water enters into the channel via the unidirectional windows or shutters is prevented from flowing back into the sea via the unidirectional windows or shutters; and
      ii) water that enters into the channel flows in a generally horizontal direction within the channel to form an artificial river whose surface height remains both substantially constant and above the sea or ocean surface; and
   b) harvesting kinetic energy of the generally horizontal flow of the artificial river.

16. The method of claim 15 wherein the energy is harvested to generate electricity.

17. The method of claim 15 further comprising:
   c) blocking, by means of a breakwater, sea or ocean waves at a location where water of the artificial river exits the channel.

18. A system for harvesting energy of sea or ocean waves flowing towards a shore, the system comprising:
   a) a channel including a side wall that includes a plurality of unidirectional windows or shutters, each window or shutter being deployed at a different elevation above a surface of the sea or ocean, the windows or shutters being configured to allow wave water to flow into the channel from the sea or ocean while preventing water in the channel from flowing back into the sea or ocean via the windows or shutters; and
   b) a slanting structure deployed in the way of waves moving towards the channel so that waves are lifted along the slanting structure into the channel via the windows, the channel and the slanting structure being configured so that wave water incessantly enters into the channel via the windows or shutters to create an artificial river having a primarily horizontal current such that a surface height of the artificial river remains both substantially constant and above the sea or ocean surface.

* * * * *